US 6,903,483 B2

(12) United States Patent
Yamamoto et al.

(10) Patent No.: US 6,903,483 B2
(45) Date of Patent: Jun. 7, 2005

(54) MOTOR

(75) Inventors: Toshio Yamamoto, Kosai (JP); Shinji Santo, Toyohashi (JP); Yasuhide Ito, Kosai (JP)

(73) Assignee: Asmo, Co., Ltd. (JP)

( * ) Notice: Subject to any disclaimer, the term of this patent is extended or adjusted under 35 U.S.C. 154(b) by 0 days.

(21) Appl. No.: 10/648,109

(22) Filed: Aug. 26, 2003

(65) Prior Publication Data

US 2004/0095036 A1 May 20, 2004

(30) Foreign Application Priority Data

Aug. 27, 2002 (JP) .................................... 2002-246274
Aug. 27, 2002 (JP) .................................... 2002-247067

(51) Int. Cl.[7] .......................................... H01R 39/04
(52) U.S. Cl. ..................................... 310/233; 310/204
(58) Field of Search ............................. 310/233, 204, 310/206, 198

(56) References Cited

U.S. PATENT DOCUMENTS

| 6,057,623 | A | | 5/2000 | Tanaka et al. | |
|---|---|---|---|---|---|
| 6,057,626 | A | * | 5/2000 | Tanaka et al. | ............... 310/233 |
| 6,181,046 | B1 | * | 1/2001 | Daikoku et al. | ............ 310/236 |
| 6,236,137 | B1 | | 5/2001 | Tanaka et al. | |
| 6,552,468 | B2 | * | 4/2003 | Lau et al. | .................... 310/270 |
| 6,756,717 | B2 | * | 6/2004 | Yamamoto et al. | ......... 310/225 |
| 2002/0121831 | A1 | | 9/2002 | Eqawa et al. | |

FOREIGN PATENT DOCUMENTS

| JP | 10-174403 | 6/1998 |
|---|---|---|
| JP | 10-341562 | 12/1998 |
| JP | 11-187622 | 7/1999 |
| JP | 2000-60073 | 2/2000 |
| JP | 2000-60074 | 2/2000 |
| JP | 2001-275327 | 10/2001 |
| JP | 2002-125350 | 4/2002 |

* cited by examiner

Primary Examiner—Darren Schuberg
Assistant Examiner—Nguyen Hanh
(74) Attorney, Agent, or Firm—Rodman & Rodman

(57) ABSTRACT

A motor has twenty-four segments and a commutator. Each of eight short-circuit members short-circuits three of the segments with one another. Each short-circuit member includes an annular base portion and three arms radially extending from the base portion. Each arm is connected to one of the three segments to be short-circuited. Each arm has a segment connection portion at the distal end. The segment connection portion is connected to the corresponding segment. The base portions are laminated in the axial direction of the commutator such that the short-circuit members form a laminated body. The arms are formed such that all the segment connection portions are located in the same position with respect to the axial direction of the laminated body. As a result, the manufacture of the motor is facilitated.

25 Claims, 8 Drawing Sheets

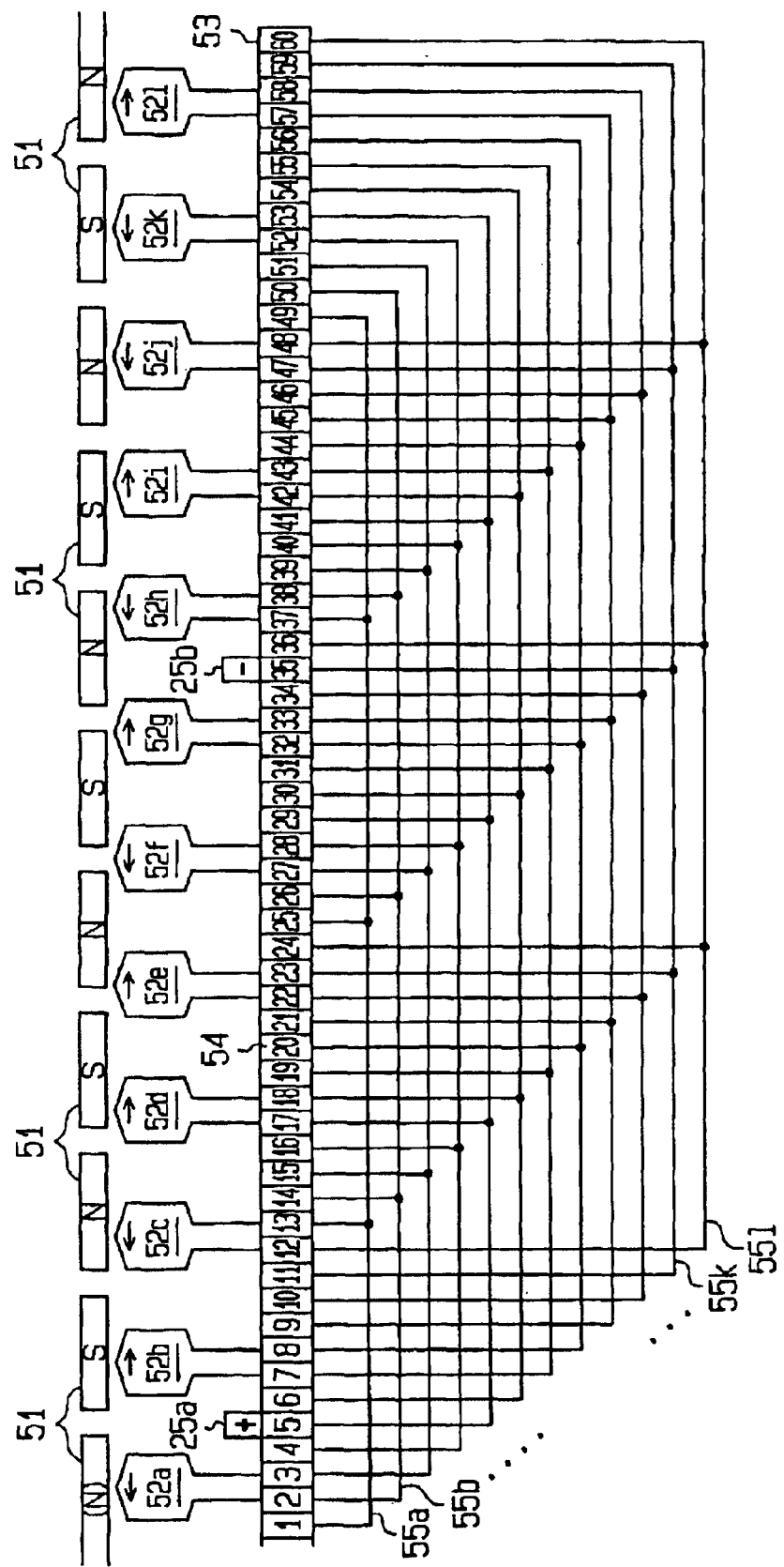

MOTOR

BACKGROUND OF THE INVENTION

The present invention relates to a motor. More particularly, the present invention pertains to a motor that has short-circuit members for connecting segments of a commutator.

A typical motor has a stator and a rotor (armature). The stator has permanent magnets, which form magnetic poles. The armature has excitation coils. The armature also includes a commentator, which has the commutator has segments arranged along the outer circumferential surface of the commutator. The armature is rotated when electric current is supplied to the excitation coils through anode supply brushes and cathode supply brushes through the segments.

If the stator of the above described motor form six magnetic poles and the armature has eight excitation coils, the force applied to the armature in the radial direction during rotation is very small. Therefore, vibration of the armature is very small. In the above described motor, the number of the segments of the commutator is generally twenty-four, and the number of the anode supply brushes and the number of the cathode supply brushes are each three. That is, the total number of the supply brushes is generally six. However, with this structure, a process for assembling a brush device is not only complicated, but also increases the size of the brush device since there are many supply brushes.

Accordingly, it has been proposed to reduce the number of supply brushes by connecting some of the segments of the commutator that have the same potential.

Short-circuit lines are used to connect the segments. However, although the short-circuit lines are effective in reducing the number of the supply brushes, it is complicated and troublesome to accurately connect each short-circuit line to segments that must be short-circuited. Also, since the process for connecting each short-circuit line to segments can be hindered by other already connected short-circuit lines, it is troublesome to connect the short-circuit lines with the segments while avoiding interferences among the short-circuit lines.

SUMMARY OF THE INVENTION

Accordingly, it is an objective of the present invention to provide a motor that is easy to manufacture.

To achieve the foregoing and other objectives and in accordance with the purpose of the present invention, a motor having a stator, an armature, an anode supply brush, and a cathode supply brush is provided. The stator has a plurality of magnetic poles arranged along the circumferential direction of the stator. The armature is rotatable relative to the stator. The armature includes a core, a commutator, a plurality of short-circuit members. The core has a plurality of teeth. A coil is wound about each tooth. The commutator has a plurality of segments arranged along the circumferential direction of the commutator. Each short-circuit member short-circuits a predetermined number of segments with one another. The supply brushes slide against the commutator. The supply brushes are arranged at a predetermined angular interval about the axis of the commutator. Each short-circuit member has a base portion and a plurality of arms extending from the base portion. Each of the arms of each short-circuit member corresponds to one of the predetermined number of the segments to be short-circuited and has a segment connection portion to which the corresponding segment is connected. The base portions are laminated to have a multi-layer structure along the axial direction of the commutator such that the short-circuit members form a laminated body. The arms are formed such that the segment connection portions are located in the same position with respect to the axial direction of the laminated body.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1(*b*) is an enlarged partial cross-sectional view of the motor shown in FIG. 1(*a*);

FIG. 3(*b*) is a connection diagram showing the excitation coils of the motor shown in FIG. 3(*a*);

FIG. 5(*b*) is a perspective view showing the connector of FIG. 5(*a*) connected to wires;

FIG. 7(*b*) is a perspective view showing the connector of FIG. 7(*a*) connected to wires;

FIG. 8(*b*) is a perspective view showing the connector of FIG. 8(*a*) connected to wires;

FIG. 11 is a developed view illustrating a motor to which the present invention may be applied.

DETAILED DESCRIPTION OF THE PREFERRED EMBODIMENTS

A first embodiment of the present invention will now be described with reference to the drawings.

Figure 1:
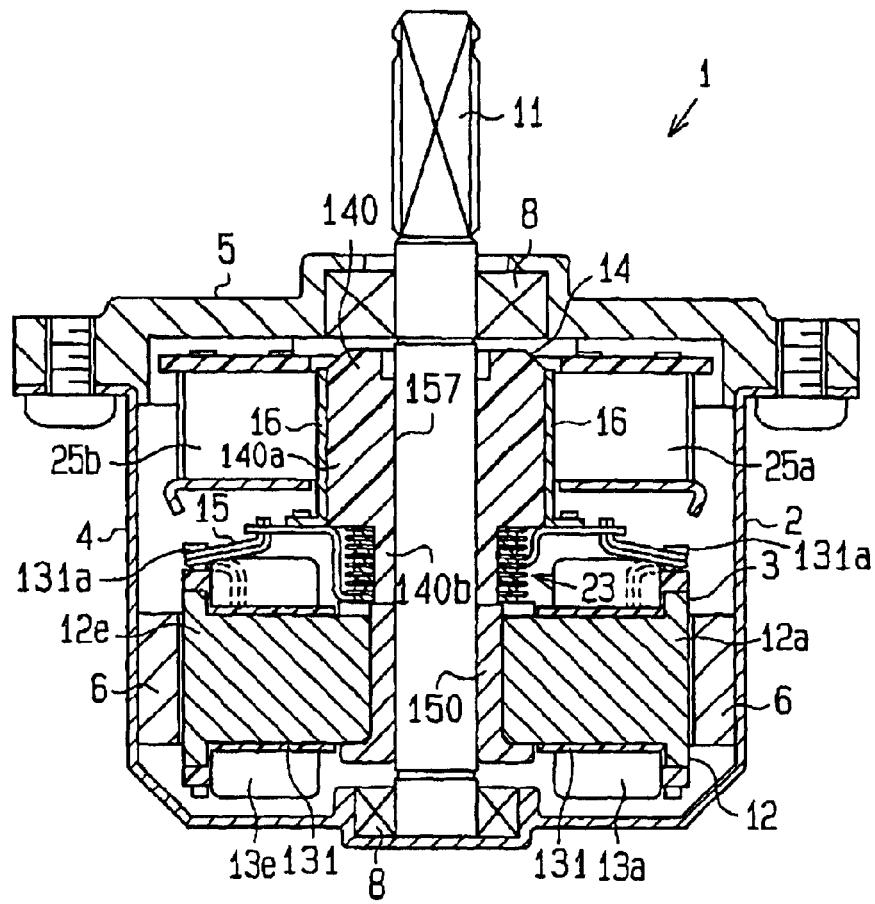
FIG. 1(*a*) is a cross-sectional view illustrating a motor according to a first embodiment of the present invention.
Figure 1:
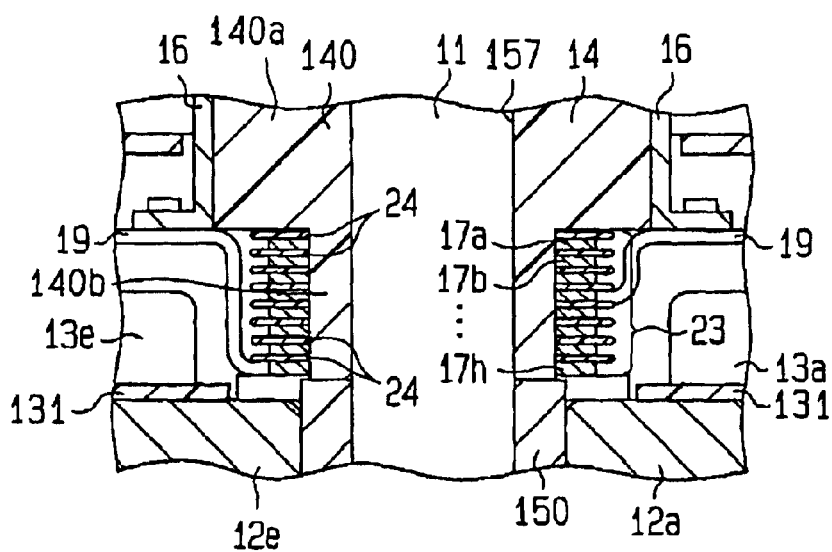

FIGS. 1(*a*), 1(*b*), and 2 illustrate a direct current motor 1 according to the first embodiment. The motor 1 includes a stator 2 and a rotor, which is an armature 3. The stator 2 has a yoke housing 4, an end flame 5, and six permanent magnets 6.

The yoke housing 4 is cup-shaped. The permanent magnets 6 are secured to the inner circumferential surface of the yoke housing 4. Each permanent magnet 6 has a substantially arcuate cross-section. The permanent magnets 6 are arranged at equal intervals in the circumferential direction of the yoke housing 4 such that the adjacent magnetic poles have different polarities. That is, the number of magnetic poles of the stator 2 is six. The armature 3 is accommodated in the yoke housing 4 and surrounded by the permanent magnets 6. The end flame 5 is attached to the yoke housing 4 with screws 7 such that the end flame 5 closes the opening of the yoke housing 4. A bearing 8 is retained at the center of the end flame 5 and another bearing 8 is retained at the center of the bottom of the yoke housing 4. The bearings 8 support a rotary shaft 11 of the armature 3.

The armature 3 has an armature core 12, excitation coils 13a to 13h, and a commutator 14 in addition to the rotary shaft 11. The armature core 12 is secured to the rotary shaft 11 with a cylindrical coupling member 150. The armature core 12 has eight teeth 12a to 12h, which extend in the radial direction. A wire 15 is wound about each of the first to eighth teeth 12a to 12h with a resin insulator 131 in between by a concentrated winding. This forms first to eighth excitation coils 13a to 13h. That is, the motor 1 according to the first embodiment has eight excitation coils 13a to 13h. The ends of each excitation coils 13a to 13h are engaged with two hooks 131a of the corresponding insulator 131.

The commutator 14 has a cylindrical insulator 140 and twenty-four segments 16 provided on the circumferential surface of the insulator 140. The insulator 140 has a large diameter portion 140a and a small diameter portion 140b. The segments 16 are attached to the circumferential surface of the large diameter portion 140a. The insulator 140 has a through hole 157 extending along its axis. The diameter of the through hole 157 is slightly less than the diameter of the rotary shaft 11. The commutator 14 is fixed to the rotary shaft 11 by press fitting the rotary shaft 11 to the through hole 157.

Figure 3A:
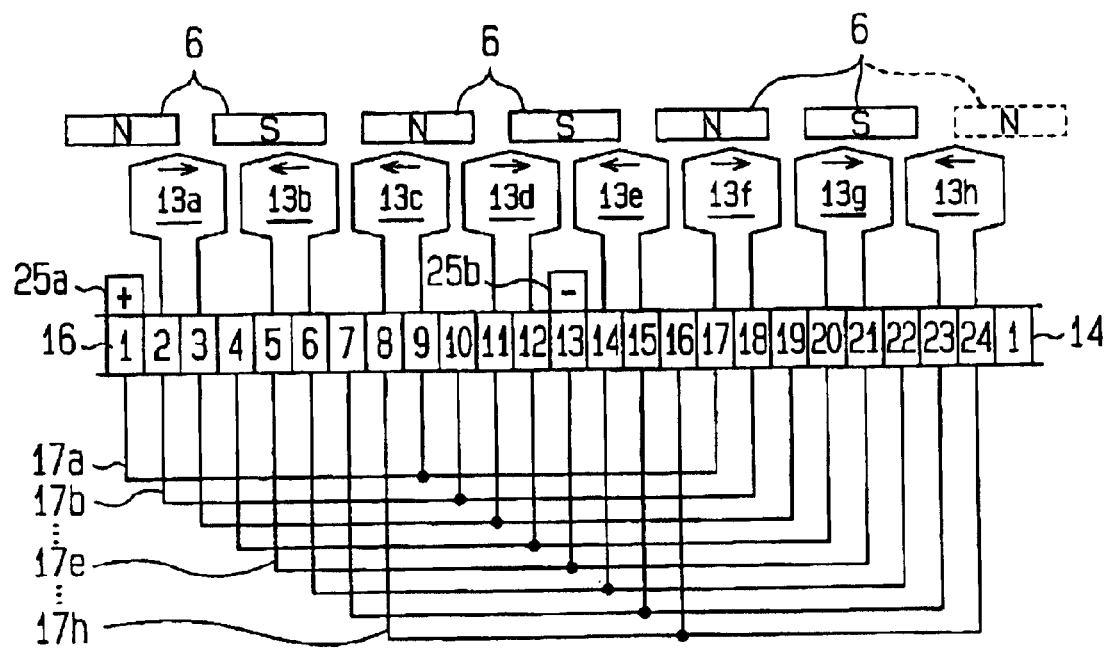
FIG. 3(*a*) is a developed view of the motor shown in FIG. 1(*a*)

In FIG. 3(a), numerals 1 to 24 are given to the segments 16 in order along the circumferential direction of the commutator 14. The No. 1 to No. 24 segments 16 are divided into eight segment groups in order from the No. 1 segment 16. Each segment group includes three segments 16. Each of the first to eighth segment groups includes first to third segments 16, which have consecutive numbers. The first to eighth segment groups correspond to the first to eighth excitation coils 13a to 13h, respectively.

In FIG. 3(a), the first segment group includes No. 1, No. 2, and No. 3 segments 16 as the first to third segments 16. The second segment group includes No. 4, No. 5, and No. 6 segments 16 as the first to third segments 16. The eighth segment group includes No. 22, No. 23, and No. 24 segments 16 as the first to third segments 16. The first segments 16 of the first to eighth segment groups are No. 1, No. 4, No. 7 . . . and No. 22 segments 16. The second segments 16 of the first to eighth segment groups are No. 2, No. 5, No. 8 . . . and No. 23 segments 16. The third segments 16 of the first to eighth segment groups are No. 3, No. 6, No. 9 . . . and No. 24 segments 16. It is clear from the above explanation to which of the first to eighth segment groups each of the No. 1 to No. 24 segments 16 belongs, and to which of the first to third segments in the segment group each of the No. 1 to No. 24 segments 16 corresponds.

The segments 16 are arranged at equal angular intervals, that is, 15 ° intervals, about the axis of the commutator 14. As shown in FIG. 3(a), three segments 16 that are apart from each other by predetermined angular intervals of 120° are connected to each other, or, in other words, short-circuited, by one of short-circuit members 17a to 17h such that the potentials of the three segments 16 become the same.

More specifically, the first short-circuit member 17a connects the No. 1 segment 16, the No. 9 segment 16, and the No 17 segment 16 to one another. The second short-circuit member 17b connects the No. 2 segment 16, the No. 10 segment 16, and the No. 18 segment 16 to one another. The third short-circuit member 17c connects the No. 3 segment 16, the No. 11 segment 16, and the No 19 segment 16 to one another. The fourth short-circuit member 17d connects the No. 4 segment 16, the No. 12 segment 16, and the No. 20 segment 16 to one another. The fifth short-circuit member 17e connects the No. 5 segment 16, the No. 13 segment 16, and the No 21 segment 16 to one another. The sixth short-circuit member 17f connects the No. 6 segment 16, the No. 14 segment 16, and the No. 22 segment 16 to one another. The seventh short-circuit member 17g connects the No. 7 segment 16, the No. 15 segment 16, and the No 23 segment 16 to one another. The eighth short-circuit member 17h connects the No. 8 segment 16, the No. 16 segment 16, and the No. 24 segment 16 to one another.

Figure 4:
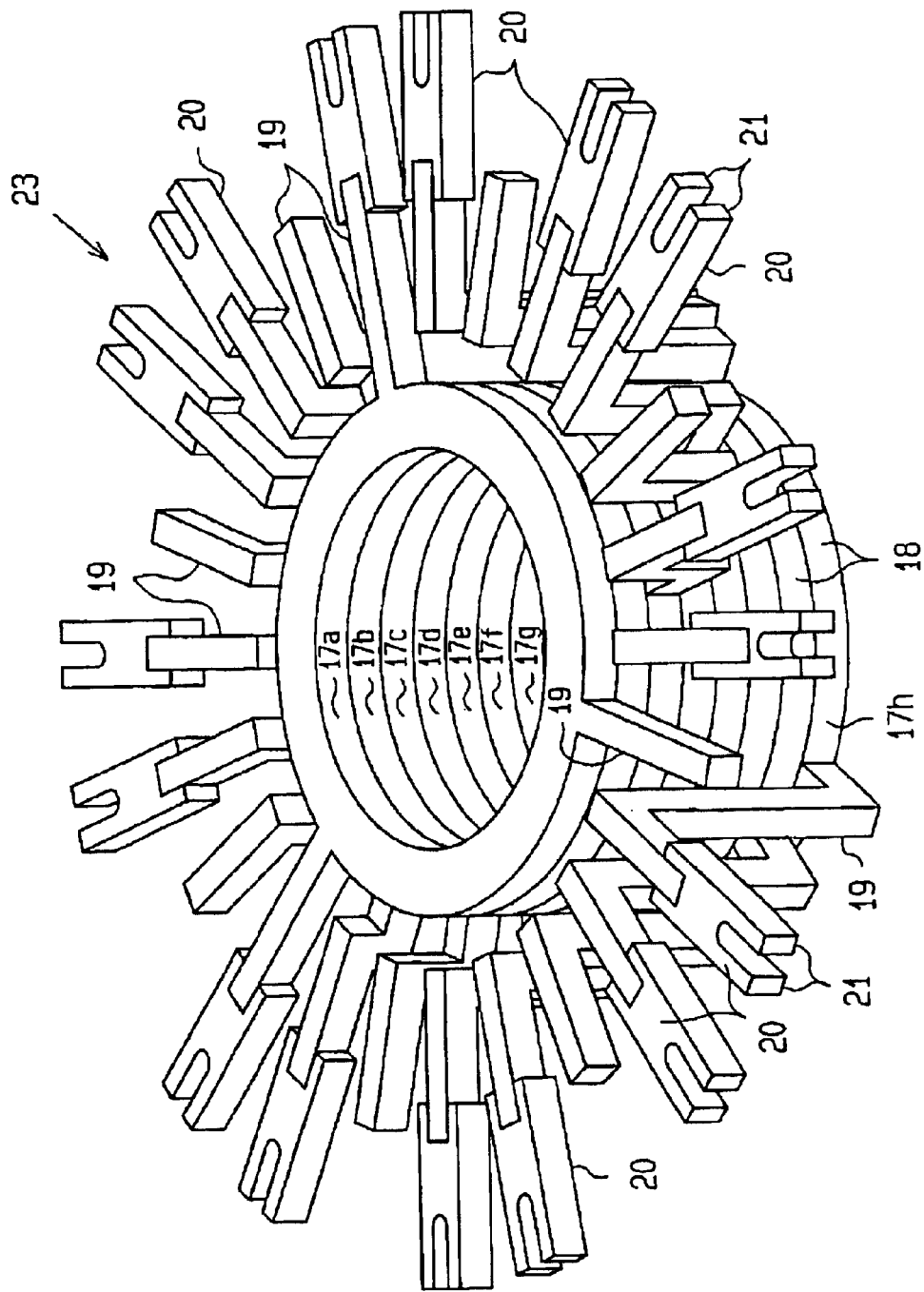
FIG. 4 is a perspective view showing a laminated body having a plurality of short-circuit members of the motor shown in FIG. 1(*a*)

Each of the first to eighth short-circuit members 17a to 17h connects three segments 16 that are arranged at angular intervals of 120°. Therefore, as shown in FIG. 4, each of the short-circuit members 17a to 17h includes a substantially annular metal base portion 18 and three radially extending arms (extended portions) 19. Each arm 19 is connected to one of the three corresponding segments 16. The three arms 19 of each of the short-circuit members 17a to 17h are arranged at angular intervals of 120° to corresponds to the arrangement of the three segments 16 to be short-circuited.

The eight short-circuit members 17a to 17h are laminated into eight layers to form a substantially cylindrical laminated body 23. Although not illustrated in FIG. 4, an insulating member 24 is located between each adjacent pair of the short-circuit members 17a to 17h (see FIG. 1(b)).

As shown in FIG. 4, the arms 19 of the first short-circuit member 17a, which is located in the uppermost layer, extend radially outward in straight lines from the corresponding base portion 18. In contrast, each of the arms 19 of the second to eighth short-circuit members 17b to 17h is bent along its longitudinal direction.

Specifically, each of the bent arms 19 is bent at two positions along its longitudinal direction. Each bent arm 19 has a first portion extending radially outward from the corresponding base portion 18, a second portion extending in the axial direction of the base portion 18 from the distal end of the first portion, and a third portion extending radially outward from the distal end of the second portion. It can be interpreted that each of the arms 19 of the first short-circuit member 17a only has the first and third portions, in other words, has no second portion (further, it can be interpreted that the length of the second portion of each arm 19 is zero in the first short-circuit member 17a).

The lengths of the first portions are the same for all the arms 19. Also, the lengths of the third portions are the same for all the arms 19. However, the lengths of the second portions are different for each of the short-circuit members 17a to 17h such that the distal ends of all the arms 19 of the first to eighth short-circuit members 17a to 17h are in the same position in the axial direction of the laminated body 23. The greater the distance from the first short-circuit member 17a in the axial direction of the laminated body 23 is, the greater the length of the second portions of the short-circuit member becomes. In this embodiment, the distal ends of all the arms 19 of the second to eighth short-circuit members 17b to 17h are in the same position as the distal ends of the arms 19 of the first short-circuit member 17a in respect with the axial direction of the laminated body 23. In other words, the distal ends of all the arms 19 are in the same single plane that is perpendicular to the axis of the laminated body 23 and includes the first short-circuit member 17a.

Figures 5A, 5B:
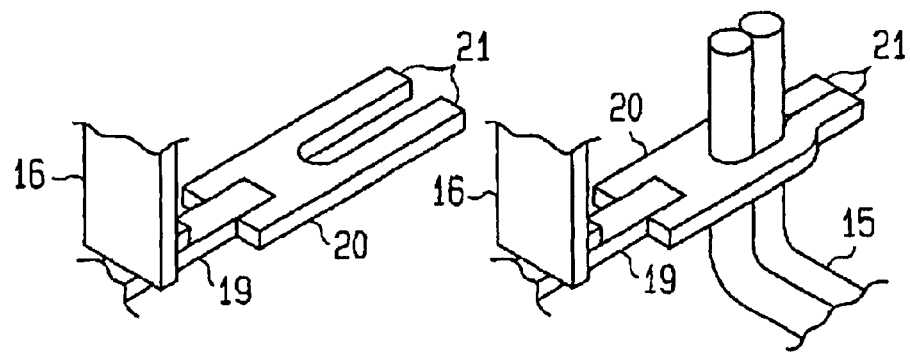
FIG. 5(*a*) is a perspective view showing a connector of the laminated body shown in FIG. 4.

As shown in FIG. 5(a), a proximal portion of the third portion of each arm 19, or a portion of the third portion that is adjacent to the radially inner end, is connected to the corresponding segment 16. Further, a connector is provided at the distal end, or the radially outer end, of the third portion of specific arms 19. Specifically, a connector 20 is provided at the end of each of the arms 19 that are connected to the first and third segments 16 of the segment group. Two of the three arms 19 of each of the short-circuit members 17a to 17h each have one of the connectors 20. The ends of the excitation coils 13a to 13h are each connected to the corresponding connectors 20.

The width of each connector 20 is wider than the corresponding arm 19 with respect to the circumferential direction of the short-circuit members 17a to 17h. Since each arm 19 extends radially from the corresponding base portion 18, a relatively large circumferential space exists between each adjacent pair of the arms 19. Therefore, even if the circumferential width of each connector 20 is wider than the circumferential width of the corresponding arm 19, adjacent ones of the connectors 20 do not interfere with each other.

As shown in FIG. 5(a), each connector 20 has a pair of holding portions 21 at the distal end. As shown in FIG. 5(b), one end of each wire 15 forming the excitation coils 13a to 13h is located between and crimped with the holding portions 21 of the corresponding connector 20. As a result, one end of the wire 15 is held by the holding portions 21 and connected to the corresponding one of the short-circuit members 17a to 17h. Since the circumferential width of each connector 20 is relatively wide, the space between the holding portions 21 can be increased so that wires 15 having a relatively large diameter can be connected to the connector 20.

The laminated body 23, which includes the short-circuit members 17a to 17h and the insulating members 24, is arranged coaxially with and fixed to the commutator 14 as shown in FIG. 1(b). Specifically, the laminated body 23 is fitted about the small diameter portion 140b of the insulator 140 of the commutator 14. The rotary shaft 11 extends through the laminated body 23. The laminated body 23 is located between the commutator 14 and the armature core 12.

When forming the laminated body 23, the first to eighth short-circuit members 17a to 17h are laminated while angularly displaced by a predetermined angle so that the arms 19 are arranged at equal angular intervals as shown in FIG. 4. Therefore, the arms 19, which are located in a single plane perpendicular to the axis of the laminated body 23, do not interfere with one another.

Also, the short-circuit members 17a to 17h are consecutively laminated such that the distal ends of the arms 19, specifically the third sections of the arms 19 to which the segments 16 are connected, are arranged in the same plane. In other words, the lengths of the second sections of the arms 19 are determined such that the distal ends of all the arms 19 are located in a single plane perpendicular to the axis of the laminated body 23.

As shown in FIG. 1(b), among the short-circuit members 17a to 17h forming the laminated body 23, the first short-circuit member 17a is closest to the segments 16 with respect to the axial direction of the commutator 14, and the eighth short-circuit member 17h is farthest from the segments 16. Therefore, as shown in FIG. 4, the second sections of the arms 19 of the eighth short-circuit member 17h must be the longest. On the other hand, the second sections of the arms 19 of the first short-circuit member 17a is set to zero. In other words, the arms 19 of the first short-circuit member 17a does not need to have second sections.

As shown in FIG. 1(b), the outer diameter of the insulating members 24 is greater than the outer diameter of the base portions 18. This reliably prevents each adjacent pair of the laminated short-circuit members 17a to 17h from contacting each other. However, the outer diameter of the insulating members 24 is sufficiently small to avoid interference with the arms 19.

When the laminated body 23 is attached to the commutator 14, part of the laminated body 23 axially overlaps with the armature core 12 as shown in FIG. 1(b). That is, for reasons of design, a substantially annular recess is formed in each axial end portion of the armature core 12. Each of the recesses is surrounded by the rotary shaft 11, the teeth 12a to 12h, and the excitation coils 13a to 13h. The laminated body 23 is located between the commutator 14 and the armature core 12 such that part of the laminated body 23 is located in one of the recesses. Even in this state, parts of the laminated body 23 that are connected to the excitation coils 13a to 13h and the segments 16, or the distal ends of the arms 19, are located out of the recess and closer to the commutator 14. Therefore, even after the commutator 14, the laminated body 23, and the armature core 12 are attached to the rotary shaft 11, the excitation coils 13a to 13h and the segments 16 are easily connected to the laminated body 23 without being hindered by the armature core 12.

Each of the first to eighth excitation coils 13a to 13h is connected to two of the arms 19 that are connected to the second and third segments 16 in the corresponding segment group (see FIG. 3(a)). Among the three arms 19 in each of the short-circuit members 17a to 17h, two arms 19 that have the connectors 20 are connected to one end of an excitation coil and to one end of another excitation coil, respectively.

Specifically, as shown in FIG. 3(a), one end of the first excitation coil 13a is connected to the arm 19 connected to the No. 2 segment 16, and the other end of the first excitation coil 13a is connected to the arm 19 connected to the No. 3 segment 16. One end of the second excitation coil 13b is connected to the arm 19 connected to the No. 5 segment 16, and the other end of the second excitation coil 13b is connected to the arm 19 connected to the No. 6 segment 16. One end of the third excitation coil 13c is connected to the arm 19 connected to the No. 8 segment 16, and the other end of the third excitation coil 13c is connected to the arm 19 connected to the No. 9 segment 16. One end of the fourth excitation coil 13d is connected to the arm 19 connected to the No. 11 segment 16, and the other end of the fourth excitation coil 13d is connected to the arm 19 connected to the No. 12 segment 16. One end of the fifth excitation coil 13e is connected to the arm 19 connected to the No. 14 segment 16, and the other end of the fifth excitation coil 13e is connected to the arm 19 connected to the No. 15 segment 16. One end of the sixth excitation coil 13f is connected to the arm 19 connected to the No. 17 segment 16, and the other end of the sixth excitation coil 13f is connected to the arm 19 connected to the No. 18 segment 16. One end of the seventh excitation coil 13g is connected to the arm 19 connected to the No. 20 segment 16, and the other end of the seventh excitation coil 13g is connected to the arm 19 connected to the No. 21 segment 16. One end of the eighth excitation coil 13h is connected to the arm 19 connected to the No. 23 segment 16, and the other end of the eighth excitation coil 13h is connected to the arm 19 connected to the No. 24 segment 16.

As shown in FIG. 1(a), an anode supply brush 25a and a cathode supply brush 25b are located about the axis of the commutator 14 at angular intervals of 180 and slide against the outer circumferential surface of the commutator 14. For example, when the anode supply brush 25a contacts the No. 1 segment 16 as shown in FIG. 3(a), the cathode supply brush 25b contacts the No. 13 segment 16, which is apart from the No. 1 segment 16 by 180 . Arrows in FIG. 3(a) represent the directions of current through the excitation coils 13a to 13h.

Figure 3B:
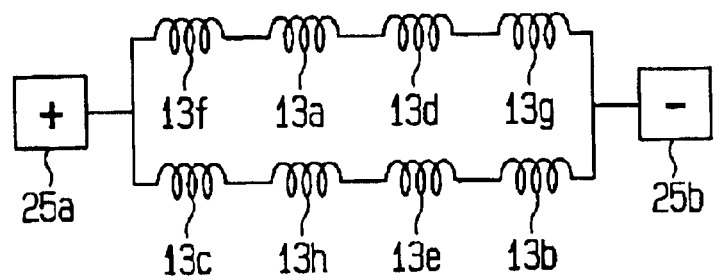

In this case, as shown in FIGS. 3(a) and 3(b), the anode supply brush 25a is connected to one end of the third excitation coil 13c and one end of the sixth excitation coil 13f via the No. 1 segment 16 and the first short-circuit member 17a. The cathode supply brush 25b is connected to one end of the second excitation coil 13b and one end of the seventh excitation coil 13g via the No. 13 segment 16 and the fifth short-circuit member 17e.

When electric current is supplied to each of the excitation coils 13a to 13h from each of the supply brushes 25a and 25b via the commutator 14, the armature 3 is rotated. According to the rotation, the segment 16 that contacts each supply brush 25a or 25b is switched, and the rotation of the armature 3 is continued.

This embodiment provides the following advantages.

The arms 19 are formed and arranged such that the portions of the arms 19 that are connected to the segments 16 are arranged in a single plane perpendicular to the axis of the laminated body 23 when the laminated body 23 is formed with the short-members 17a to 17h. Therefore, each segment 16 is connected to the corresponding one of the short-circuit members 17a to 17h without interfering with the armature core 12. Further, the segments 16 are connected to the short-circuit members 17a to 17h through a standardized procedure.

Also, since the portions of the arms 19 that are connected to the segments 16, that is, the segment connection portions of the arms 19, are located in a single plane perpendicular to the axis of the laminated body 23, all the segments 16 are formed to have the same shape. This facilitates the manufacture of the motor 1.

The short-circuit members 17a to 17h are laminated in a predetermined order to form the single laminated body 23. The twenty-four arms 19 are arranged in a predetermined order such that the three arms of each of the short-circuit members 17a to 17h to correspond to three of the segments 16 to be short-circuited. Therefore, by simply attaching the laminated body 23 to the commutator 14 while adjusting the circumferential positions of the laminated body 23 and the commutator 14, all the arms 19 are arranged to accurately correspond to the segments 16 to be connected, and the segments 16 are short-circuited in a desired manner. This simplifies the manufacturing procedures.

Part of the laminated body 23 is located in the recess formed in an end of the armature core 12, and the distal ends of all the arms 19 are located out of the recess and closer to the commutator 14. Therefore, even after the commutator 14, the laminated body 23, and the armature core 12 are attached to the rotary shaft 11, the excitation coils 13a to 13h and the segments 16 are easily connected to the laminated body 23 without being hindered by the armature core 12.

Since part of the laminate body 23 axially overlaps the armature core 12, the axial size of the motor 1 is reduced.

Since each arm 19 extends radially from the corresponding base portion 18, a relatively large circumferential space exists between each adjacent pair of the arms 19. Therefore, even if the distal ends of all the arms 19 are located in a single plane perpendicular to the axis of the laminated body 23, the excitation coils 13a to 13h and the segments 16 are easily connected to the arms 19 without causing each adjacent pair of the arms 19 to interfere with each other or establish a short-circuit. Accordingly, the motor 1 has a reduced possibility of malfunctions and is easy to manufacture.

Since the circumferential space between each adjacent pair of the arms 19 is relatively wide, the circumferential width of each connector 20 connected to the arm 19 is set wider than the circumferential width of the arm 19. Since the circumferential width of each connector 20 is relatively wide, the space between the holding portions 21 can be increased so that a wire 15 having a relatively large diameter can be connected to the connector 20. Since a wire 15 of a great diameter has a great current capacity, the motor 1 can receive a high current and generate a high power.

Figure 2:
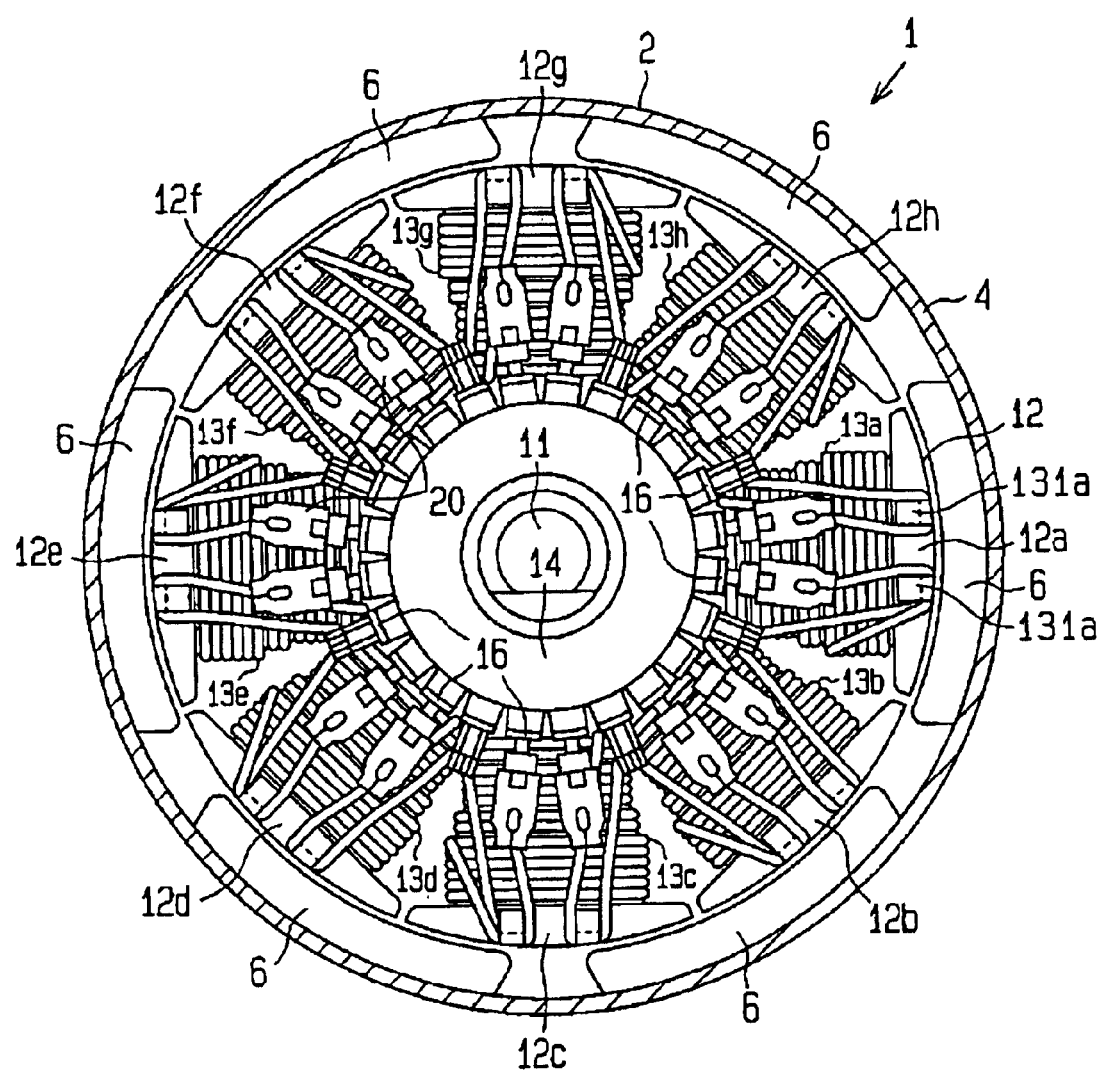
FIG. 2 is a cross-sectional view of the motor shown in FIG. 1(*a*)

Each of the first to eighth excitation coils 13a to 13h is connected to the connectors 20 of the arms 19 that are connected to the second and third segments 16 in the corresponding segment group. That is, as shown in FIG. 2, the ends of each of the excitation coils 13a to 13h are connected to the closest two of the connectors 20. Thus, the lengths of parts of the wires 15 that are drawn from the excitation coil 13a to 13h can be minimized, which simplifies the wiring configuration. Also, since the wires 15 do not overlap, the wires 15 are easily connected to the connectors 20.

The holding portions 21 of each connector 20 are crimped to hold the wire 15. Thus, the wire 15 is securely connected to the arm 19.

Figure 6:
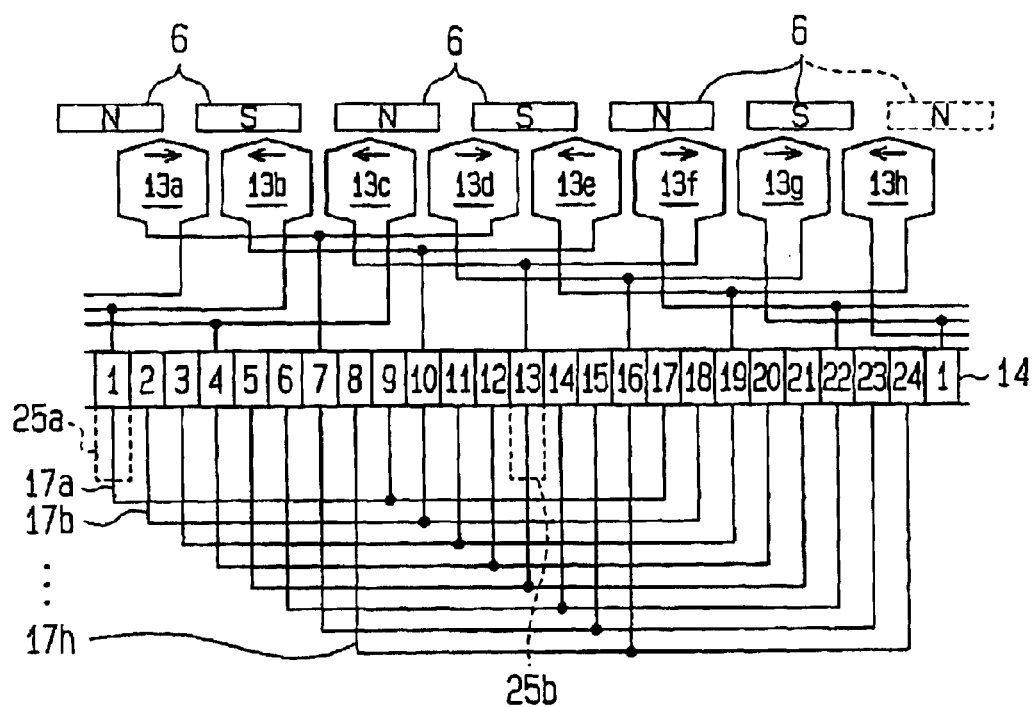
FIG. 6 is a developed view illustrating a motor according to a second embodiment of the present invention.

In the first embodiment of FIGS. 1 to 5(b), two of the three arms 19 in each of the short-circuit members 17a to 17h are connected to the connectors 20. Each connector 20 is connected to one end of an excitation coil and to one end of another excitation coil. However, only one of the three arms 19 in each of the short-circuit members 17a to 17h may be connected to the connector 20, and one end of an excitation coil and one end of another excitation coil may be connected to the one connector 20. Such a configuration is illustrated in FIG. 6 as a second embodiment. Like or the same reference numerals are given to those components that are like or the same as the corresponding components of the first embodiment of FIGS. 1 to 5(b) and detailed explanations are omitted.

In the embodiment shown in FIG. 6, one end of the first excitation coil 13a is connected to the connector 20 of the arm 19 connected to the No. 7 segment 16, and the other end of the first excitation coil 13a is connected to the connector 20 of the arm 19 connected to the No. 22 segment 16. One end of the second excitation coil 13b is connected to the connector 20 of the arm 19 connected to the No. 10 segment 16, and the other end of the second excitation coil 13b is connected to the connector 20 of the arm 19 connected to the No. 1 segment 16. One end of the third excitation coil 13c is connected to the connector 20 of the arm 19 connected to the No. 13 segment 16, and the other end of the third excitation coil 13c is connected to the connector 20 of the arm 19 connected to the No. 4 segment 16. One end of the fourth excitation coil 13d is connected to the connector 20 of the arm 19 connected to the No. 16 segment 16, and the other end of the fourth excitation coil 13d is connected to the connector 20 of the arm 19 connected to the No. 7 segment 16. One end of the fifth excitation coil 13e is connected to the connector 20 of the arm 19 connected to the No. 19 segment 16, and the other end of the fifth excitation coil 13e is connected to the connector 20 of the arm 19 connected to the No. 10 segment 16. One end of the sixth excitation coil 13f is connected to the connector 20 of the arm 19 connected to the No. 22 segment 16, and the other end of the sixth excitation coil 13f is connected to the connector 20 of the arm 19 connected to the No. 13 segment 16. One end of the seventh excitation coil 13g is connected to the connector 20 of the arm 19 connected to the No. 1 segment 16, and the other end of the seventh excitation coil 13g is connected to the connector 20 of the arm 19 connected to the No. 16 segment 16. One end of the eighth excitation coil 13h is connected to the connector 20 of the arm 19 connected to the No. 4 segment 16, and the other end of the eighth excitation coil 13h is connected to the connector 20 of the arm 19 connected to the No. 19 segment 16.

This configuration cuts the time for connecting the excitation coil 13a to 13h to the connectors 20 in half of that required for the embodiment of FIGS. 1 to 5(b). Also, since the number of the connections of the excitation coils 13a to 13h to the laminated body 23 is reduced, the possibility of malfunctions due to poor connections of the connectors 20 is reduced. Even if there is a poor connection, the location of the poor connection will be easily identified. This facilitates the repair.

Figure 7A:
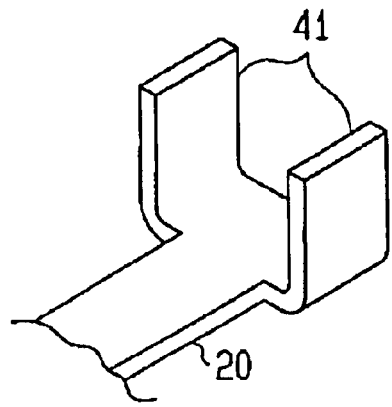
FIG. 7(*a*) is a perspective view illustrating a connector according to a third embodiment of the present invention.
Figure 7B:
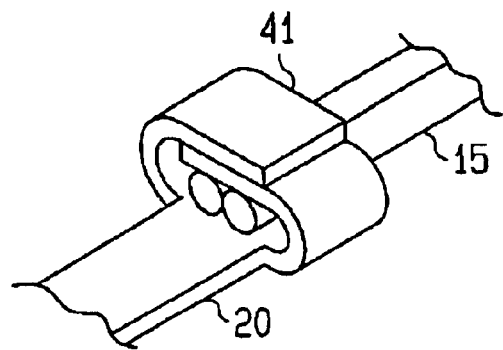
Figure 8A:
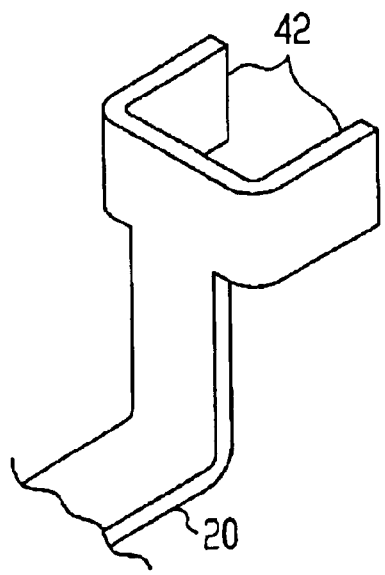
FIG. 8(*a*) is a perspective view illustrating a connector according to a fourth embodiment of the present invention.
Figure 8B:
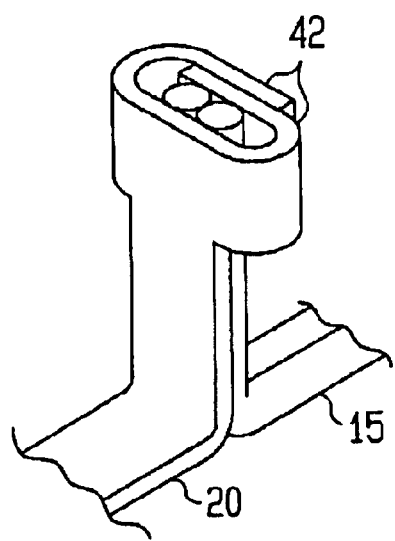

The connector 20 shown in FIG. 5(a) has the two holding portions 21. However, the shape of the holding portions is not limited to the one shown in FIG. 5(a). For example, in a third embodiment shown in FIG. 7(a), the connector 20 has a pair of holding portions 41 in the axial direction of the laminated body 23 (vertical direction of FIG. 7(a)). As shown in FIG. 7(b), the holding portions 41 are crimped to overlap each other to hold the wires 15. In a fourth embodiment shown in FIG. 8(a), the connector 20 is bent to extend in the axial direction of the laminated body 23 and has a pair of holding portions 42 extending radially outward of the laminated body 23. As shown in FIG. 8(b), the holding portions 42 are crimped to overlap each other to hold the wires 15.

A fifth embodiment of the present invention will now be described with reference to FIG. 9. The differences from the first embodiment of FIGS. 1 to 5(b) will mainly be discussed.

In this embodiment, the armature core 12 is coupled to the rotary shaft 11 with a coupling member 150 that has substantially an H-shaped cross-section. That is, the coupling member 150 has a cylindrical portion 151 and a substantially disk-shaped bottom portion 152. The armature core 12 is fitted about cylindrical portion 151. The bottom portion 152 is located in an interior space (hollow portion) 150a defined by the cylindrical portion 151. The bottom portion 152 is substantially located in the axial center of the cylindrical portion 151, and divides the interior space 150a into two. The outer diameter of the coupling member 150 is slightly greater than the diameter of a center bore 125 of the core 12. The coupling member 150 is press fitted to the center bore 125 of the core 12 and is fixed to the core 12. The axial length of the coupling member 150 is substantially equal to the axial length of the inner wall of the center bore 125.

A cylindrical fixing portion 153 extends from the bottom portion 152 in a direction away from the commutator 14. A through hole 154 axially extends through the fixing portion 153 and the bottom portion 152. The diameter of the through hole 154 is slightly less than the diameter of the rotary shaft 11. The commutator 150 is fixed to the rotary shaft 11 by press fitting the rotary shaft 11 to the through hole 154.

The small diameter portion 140b of the insulator 140 of the commutator 14 contacts the bottom portion 152 of the coupling member 150. The small diameter portion 140b and the laminated body 23, which is located about the small diameter portion 140b, are substantially entirely located in an accommodation space defined by the cylindrical portion 151 and the bottom portion 152, or in the interior space 150a. That is, the small diameter portion 140b and the laminated body 23 are substantially entirely within the axial range of the armature core 12.

As a result, compared to the first embodiment of FIGS. 1 to 5(b), the axial size of the armature 3 is further reduced. This reduces the axial size of the motor 1. Also, since the coupling member 150 has the interior space 150a, or the hollow portion, the weight of the coupling member 150 is reduced. Further, since the diameter of the center hole 125 of the core 12 is large, the weight of the core 12 is reduced. As a result, the weight of the armature 3 is reduced, and thus, the weight of the motor 1 is reduced.

The distal ends of all the arms 19 of the laminated body 23 are in the same position with respect to the axial direction of the laminated body 23. Therefore, the laminated body 23 is arranged to axially overlap the interior space 150a by a desired amount. The distal ends of the arms 19, that is, portions of the arms 19 to which the excitation coils 13a to 13h and the segments 16 are connected, are relatively covered by the core 12 and the insulator 140. That is, the distal ends of the arms 19 are relatively shielded from the supply brushes 25a, 25b. Therefore, particles generated due to sliding of the segments 16 against the supply brushes 25a, 25b are less likely to collect on the distal ends of the arms 19. This reduces the possibility of poor electric conductions of electricity.

The coupling member 150 has the bottom portion 152, which substantially divides the interior space of the coupling member 150 into two. Since the coupling member 152 contacts the insulator 140, the positions of the commutator 14 and the core 12 are easily and reliably determined. Also, the position of the laminated body 23 is easily and reliably determined in the interior space 50a.

The coupling member 150 has the cylindrical fixing portion 153, and the rotary shaft 11 is press fitted in the through hole 154 of the fixing member 153. Since the fixing portion 153 has a certain length along the axial direction, the coupling member 150 contacts the rotary shaft 11 at a relatively large area. The core 12 is therefore reliably coupled to the rotary shaft 11.

A sixth embodiment of the present invention will now be described with reference to FIG. 10. The differences from the fifth embodiment of FIG. 9 will mainly be discussed.

Figure 9:
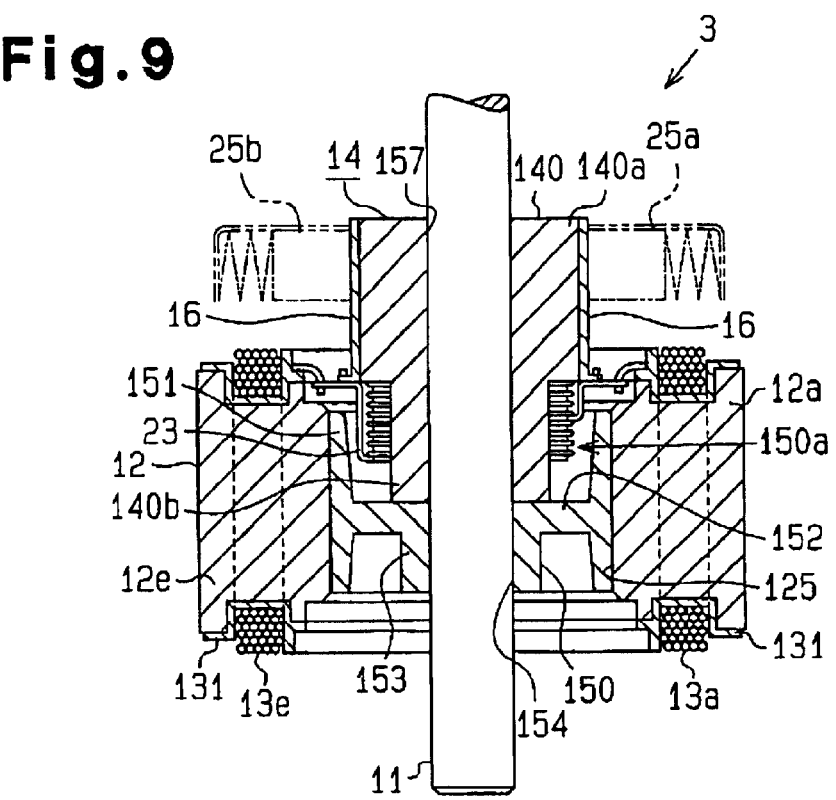
FIG. 9 is a cross-sectional view illustrating an armature according to a fifth embodiment of the present invention.
Figure 10:
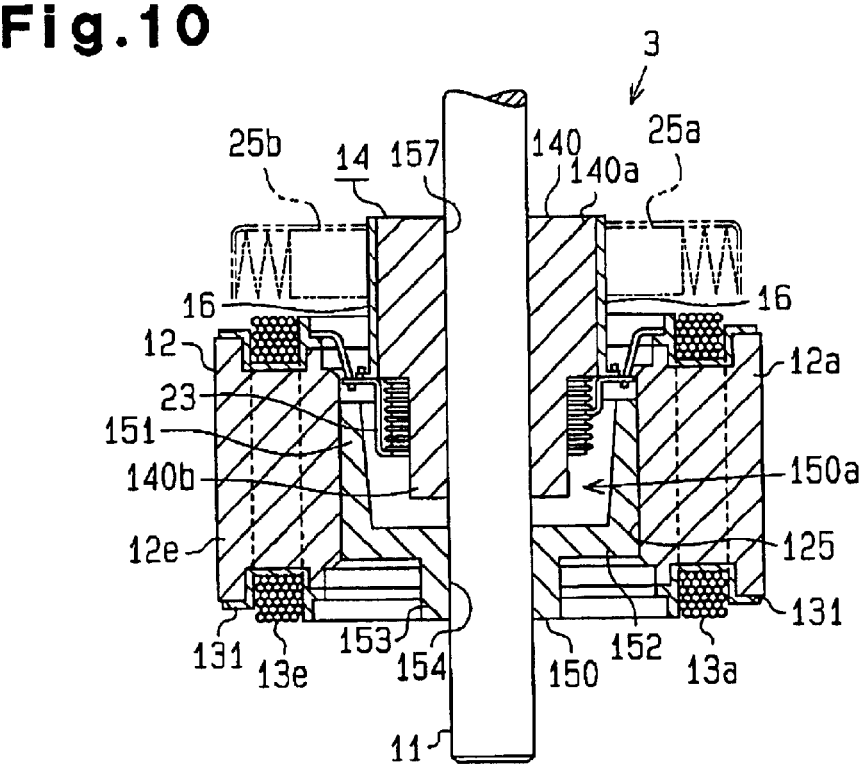
FIG. 10 is a cross-sectional view illustrating an armature according to a sixth embodiment of the present invention.

As shown in FIG. 10, a coupling member 150 of this embodiment, a bottom portion 152 is located at an axial end of a cylindrical portion 151. Therefore, the axial size of the accommodation space defined by the cylindrical portion 151 and the bottom portion 152, or the axial size of the interior space 150a, is greater than that of the embodiment of FIG. 9. Further, the axial size of the cylindrical portion 151 is less than that of the embodiment of FIG. 9. As a result, the laminated body 23 is entirely located within the axial range of the core 12, and the axial length of a part of the commutator 14 that is located in the axial range of the core 12 is increased compared to the embodiment of FIG. 9.

The distal portion of the fixing portion 153, which extends from the bottom portion 152, is flush with the outer end of an insulator 131 located between each of the teeth 12a to 12h of the core 12 and the corresponding one of the excitation coils 13a to 13h.

As a result, compared to the fifth embodiment of FIG. 9, the axial size of the armature 3 is further reduced in the embodiment of FIG. 10. This reduces the axial size of the motor 1.

The above illustrated embodiments may be modified as follows.

In the illustrated embodiments, the base portion 18 of each short-circuit member 17a to 17h is substantially annular. However, the base portion 18 may be an arcuate body, which is formed by cutting out a part of an annular body. This reduces the weight of the laminated body 23, and thus reduces the weight of the motor.

The motor 1 shown in FIG. 1(a) has six poles, eight excitation coils, and twenty-four segments. In each of the short-circuit members 17a to 17h, part of the base portion 18 between the two arms 19 each having the connector 20 may be removed. In each of the short-circuit members 17a to 17h of the motor shown in FIG. 6, part of the base portion 18 between the two arms 19 each having no connector 20 may be removed. These configurations not only reduce the weight of the laminated body 23, but also maintain the weight balance even if the short-circuit members 17a to 17h are arcuate.

The present invention may be applied to motors other than a motor having six poles, eight excitation coils, and twenty-four segments. Particularly, the present invention is suitable for a motor with brushes of concentrated winding, in which motor radial force acting on an armature is significantly small when the armature is rotated. Such a motor is defined as a motor in which the number of poles of the stator (the number of permanent magnets) is represented by 2N (2N is an integer equal to or more than six), the number M of the excitation coils of the armature is represented by 2N⨯2 (M is an integer), and the number S of the segments of the commutator is represented by N⨯M. In this case, the number T of short-circuit members is M, and the number O of the arms is N.

Specifically, the present invention may be embodied in a motor shown in FIG. 11. In this motor, the number of permanent magnets 51 of a stator is ten, the number of excitation coils 52a to 52l is twelve, and the number of segments 54 of a commutator 53 is sixty. In FIG. 11, numerals 1 to 60 are given to the segments 54. The No. 1 to No. 60 segments 54 are divided into twelve segment groups in order from the No. 1 segment 54. Each segment group has five of the segments 54. Each of the first to twelfth segment groups includes first to fifth segments 54, which have consecutive numbers. Five segments 54 that are apart from each other by angular intervals of 72° are short-circuited by one of short-circuit members 55a to 55l. Both ends of each of the excitation coils 52a to 52l are connected to the second and third segments 54 of the corresponding segment group with arms of the short-circuit members 55a to 55l.

In the embodiments of FIGS. 9 and 10, the coupling member 150 is press fitted in the center hole 125 of the core 12. However, the coupling member 150 may be adhered to the inner wall of the center hole 125.

In the embodiments of FIGS. 9 and 10, the shape of the coupling member 150 is not limited to the illustrated ones as long as the coupling member 150 has a hollow portion for accommodating at least part of the small diameter portion 140b and the laminated body 23.

In the embodiments of FIGS. 9 and 10, the axial position of the bottom portion 152 relative to the cylindrical portion 151 may be changed in the axial range of the cylindrical portion 151 as necessary.

In the embodiments of FIGS. 9 and 10, the fixing portion 153 of the coupling member 150 need not be cylindrical. For example, the fixing portion 153 may be shaped like a prism. As long as the small diameter portion 140b and the laminated body 23 are permitted to be in the interior space 150a, a part of the fixing portion 153 may extend from the bottom portion 152 toward the commutator 14. For example, in the embodiment of FIG. 10, a part of the fixing portion 153 extending from the bottom portion 152 from the commutator 14 may contact the small diameter portion 140b, thereby determining the axial positions of the commutator 14 and the core 12 relative to each other.

In the embodiments of FIGS. 9 and 10, as long as the bottom portion 152 of the coupling portion 150 couples the cylindrical portion 151 with the fixing portion 153, the bottom portion 152 need not be shaped like a plate.

The cross-section of the center bore 125 of the core 12 need not be circular. As long as the cross-section substantially conforms to the circumferential shape of the coupling member 150, the cross-section may be, for example, polygonal.

The core 12 may be formed by laminating metal plates or compression molding a mixture of magnetic powder and resin powder. The resin powder functions to couple the particles of the magnetic powder to each other. If molded with magnetic powder, the core 12 has a relatively low solidity and is easy to shatter with a shredder. This facilitates retrieve and recycle of the excitation coils 13a to 13h. Further, if the core 12 is molded with magnetic powder, a core having a complicated shape is relatively easily formed.

Therefore, the present examples and embodiments are to be considered as illustrative and not restrictive and the invention is not to be limited to the details given herein, but may be modified within the scope and equivalence of the appended claims.

What is claimed is:

1. A motor comprising:

a stator, which has a plurality of magnetic poles arranged along the circumferential direction of the stator;

an armature rotatable relative to the stator, the armature including:

a core having a plurality of teeth, wherein a coil is wound about each tooth;

a commutator, which has a plurality of segments arranged along the circumferential direction of the commutator; and a plurality of short-circuit members, wherein each short-circuit member short-circuits a predetermined number of segments with one another; and an anode supply brush and a cathode supply brush, wherein the supply brushes slide against the commutator, and wherein the supply brushes are arranged at a predetermined angular interval about the axis of the commutator, wherein each short-circuit member has a base portion and a plurality of arms radially extending from the base portion, wherein each of the arms of each short-circuit member corresponds to one of the predetermined number of the segments to be short-circuited and has a segment connection portion to which the corresponding segment is connected, wherein the base portions are laminated to have a multi-layer structure along the axial direction of the commutator such that the short-circuit members form a laminated body, wherein the arms are formed such that the segment connection portions are located in the same position with respect to the axial direction of the laminated body, and wherein the arms include specific arms each of which is provided with a connector at a distal end, wherein each connector is located radially outwards with respect to the segment connection portion and is directly connected to an end of one of the coils.

2. The motor according to claim 1, wherein the base portion of each short-circuit member is annular or arcuate.

3. The motor according to claim 2, wherein an insulating member is located between the base portions of each adjacent pair of the layers in the laminated body, and wherein the insulating members have a diameter greater than the diameter of the base portions and are formed not to interfere with the arms.

4. The motor according to claim 1, wherein the arms include bent arms, and wherein the bent arms are bent such that the corresponding segment connection portions are each located in a different position from the position of the corresponding base portion with respect to the axial direction of the laminated body.

5. The motor according to claim 4, wherein each bent arm has a first portion radially extending from the corresponding base portion, a second portion extending in the axial direction of the laminated body from the distal end of the first portion, and a third portion radially extending from the distal end of the second portion, and wherein the segment connection portion is provided at the third portion.

6. The motor according to claim 4, wherein the short-circuit member that is located at an axial end of the laminated body is a first short-circuit member, wherein the arms of the first short-circuit member are not bent, and wherein all the segment connection portions are located in a single plane that is perpendicular to the axis of the laminated body and contains the first short-circuit member.

7. The motor according to claim 6, wherein each bent arm has a first portion radially extending from the corresponding base portion, a second portion extending in the axial direction of the laminated body from the distal end of the first portion, and a third portion radially extending from the distal end of the second portion, wherein the segment connection portion is provided at the third portion, and wherein the greater the distance from the first short-circuit member in the axial direction of the laminated body is, the greater the length of the second portions of the short-circuit member becomes.

8. The motor according to claim 1, wherein the arms of each short-circuit member are arranged at a predetermined angular interval about the base portion.

9. The motor according to claim 8, wherein the short-circuit members are laminated such that all the arms do not interfere with one another with respect to the circumferential direction of the laminated body.

10. The motor according to claim 1, wherein two of the arms of each short-circuit member are each provided with the connector, and wherein one of the two connectors is connected to an end of one of the coils and the other connector is connected to an end of another coil.

11. The motor according to claim 1, wherein one of the arms of each short-circuit member is provided with the connector, and wherein the connector is connected to an end of one of the coils and to an end of another coil.

12. The motor according to claim 1, wherein at least part of the laminated body is located in the axial range of the core.

13. The motor according to claim 12, wherein the core has a center bore extending through the core, wherein the armature includes a rotary shaft about which the commutator and the laminated body are fitted, and a coupling member for coupling the core with the rotary shaft, wherein the coupling member is fitted about the rotary shaft and fitted to the center bore, and wherein the coupling member has a hollow portion for accommodating at least part of the laminated body.

14. The motor according to claim 13, wherein the coupling member has a cylindrical portion arid a bottom portion, wherein the cylindrical portion is fitted to the center bore of the core, wherein the bottom portion is located in the axial range of the cylindrical portion, and wherein the bottom portion, together with the cylindrical portion, defines the hollow portion in the coupling member.

15. The motor according to claim 14, wherein the laminated body is located between the core and the commutator with respect to the axial direction of the rotary shaft, and wherein the bottom portion is located at an axial center of the cylindrical portion or at a section of the cylindrical portion that is farther from the commutator than the axial center.

16. The motor according to claim 14, wherein the coupling member has a fixing portion, wherein the fixing portion extends from the bottom portion in the axial direction of the coupling member and is fitted about the rotary shaft.

17. The motor according to claim 13, wherein the laminated body is located between the core and the commutator with respect to the axial direction of the rotary shaft, and wherein the segment connection portions are located at a position in the vicinity of an axial end of the laminated body, the axial end being closer to the commutator.

18. A motor comprising:
a stator, which has a plurality of magnetic roles arranged along the circumferential direction of the stator;
an armature rotatable relative to the stator, the armature including:
a core having a plurality of teeth, wherein a coil is wound about each tooth;
a commutator, which has a plurality of segments arranged along the circumferential direction of the commutator; and
a plurality of short-circuit members, wherein each short-circuit member short-circuits a redetermined number of segments with one another; and
an anode supply brush and a cathode supply brush, wherein the supply brushes slide against the commutator, and wherein the supply brushes slide against the commutator, and wherein the supply brushes are arranged at a predetermined angular interval about the axis of the commutator,
wherein each short-circuit member has a base portion and a plurality of arms extending from the base portion, wherein each of the arms of each short-circuit member corresponds to one of the predetermined number of the segments to be short-circuited and has a segment connection portion to which the corresponding segment is connected,
wherein the base portions are laminated to have a multi-layer structure alone the axial direction of the commutator such that the short-circuit members form a laminated body, wherein the arms are formed such that the segment connection portions are located in the same position with respect to the axial direction of the laminated body, and wherein the number of the magnetic poles is represented by 2N (N is an integer number greater than or equal to three), wherein the number M of the coils is represented by 2N±2, and wherein the number S of the segments is represented by N×M.

19. The motor according to claim 18, wherein the number of the magnetic poles is six, the number of the coils is eight, and the number of the segments is twenty-four, and wherein each short-circuit member short circuits three of the segments.

20. A motor comprising:
a stator, which has a plurality of magnetic poles arranged along the circumferential direction of the stator;
an armature rotatable relative to the stator, the armature including:
a core having a plurality of teeth, wherein a coil is wound about each tooth;
a commutator, which has a plurality of segments arranged along the circumferential direction of the commutator; and
a plurality of short-circuit members wherein each short-circuit member short-circuits a predetermined number of segments with one another; and
an anode supply brush and a cathode supply brush, wherein the supply brushes slide against the commutator and wherein the supply brushes are arranged at a predetermined angular interval about the axis of the commutator,
wherein each short-circuit member has a base portion and a plurality of arms radially extending from the base portion and arranged at a predetermined angular interval about the base portion, wherein each of the arms of each short-circuit member corresponds to one of the predetermined number of the segments to be short-circuited and has a segment connection portion to which the corresponding segment is connected,
wherein the base portions are laminated to have a multi-layer structure along the axial direction of the commutator such that the short-circuit members form a laminated body,
wherein the arms are formed such that the segment connection portions are located in the same position with respect to the axial direction of the laminated body, and
wherein the arms include specific arms each of which is provided with a connector at a distal end, wherein each connector is connected to an end of one of the coils, and wherein the width of the connectors is greater than the width of the arms with respect to the circumferential direction of the short-circuit members.

21. The motor according to claim 20, wherein each connector includes a pair of holding portions for holding one end of the corresponding coil.

22. A motor comprising:
a stator, which has a plurality of magnetic poles arranged along the circumferential direction of the stator;
an armature rotatable relative to the stator, the armature including:

a rotary shaft;
a core, which is fitted to the rotary shaft and has a plurality of teeth, and wherein a coil is wound about each tooth;
a commutator, which is fitted to the rotary shaft and has a plurality of segments arranged along the circumferential direction of the commutator; and
a plurality of short-circuit members, wherein each short-circuit member short-circuits a predetermined number of segments with one another; and
an anode supply brush and a cathode supply brush, wherein the supply brushes slide against the commutator, and wherein the supply brushes are arranged at a predetermined angular interval about the axis of the commutator,
wherein each short-circuit member has an annular or arcuate base portion and a plurality of arms radially extending from the base portion, wherein each of the arms of each short-circuit member corresponds to one of the predetermined number of the segments to be short-circuited and has a segment connection portion at a distal end, and wherein the corresponding segment is connected to the segment connection portion,
wherein the base portions are laminated to have a multi-layer structure along the axial direction of the commutator such that the short-circuit members form a laminated body, and wherein the laminated body is located between the core and the commutator and fitted to part of the commutator,
wherein the arms are formed such that all the segment connection portions are located in a single plane perpendicular to the axis of the laminated body, and
wherein the arms include specific arms each of which is provided with a connector at the distal end, wherein each connector is located radially outwards with respect to the segment connection portion and is directly connected to an end of one of the coils.

23. The motor according to claim 22, wherein the short-circuit member that is closest to the commutator is a first short-circuit member, wherein the arms of the first short-circuit member are located in the single plane and are not bent, and wherein the arms of the other short-circuit members are bent arms, and wherein the bent arms are bent such that the corresponding segment connection portions are each located in a different position from the position of the corresponding base portion with respect to the axial direction of the laminated body.

24. The motor according to claim 22, wherein the core has a center bore extending through the core, wherein the armature includes a coupling member for coupling the core with the rotary shaft, wherein the coupling member is fitted about the rotary shaft and fitted to the center bore, and wherein the coupling member has a hollow portion for accommodating at least part of the laminated body.

25. The motor according to claim 24, wherein the coupling member has a cylindrical portion and a bottom portion, wherein the cylindrical portion is fitted to the center bore of the core, wherein the bottom portion is located in the axial range of the cylindrical portion, and wherein the bottom portion, together with the cylindrical portion, defines the hollow portion in the coupling member.

* * * * *

UNITED STATES PATENT AND TRADEMARK OFFICE
CERTIFICATE OF CORRECTION

PATENT NO. : 6,903,483 B2  Page 1 of 1
DATED : June 7, 2005
INVENTOR(S) : Toshio Yamamoto et al.

It is certified that error appears in the above-identified patent and that said Letters Patent is hereby corrected as shown below:

Column 1,
Line 13, change "commentator" to -- commutator --; and delete "has" (second occurrence).

Column 4,
Line 3, change "17acon" to -- 17a con --.
Line 9, change "No 19" to -- No. 19 --.
Line 14, change "No 21" to -- No. 21 --.
Line 18, change "No 23" to -- No. 23 --.
Line 30, change "to corresponds" to -- corresponds --.

Column 5,
Line 1, change "17bto" to -- 17b to --.

Column 7,
Line 52, change "17h to correspond" to -- 17h correspond --.

Column 11,
Lines 48 and 58, change "521" to -- 52*l* --.
Lines 57 and 60, change "551" to -- 55*l* --.

Column 14,
Line 14, change "arid" to -- and --.
Line 39, change "roles" to -- poles --.
Line 49, change "redetermined" to -- predetermined --.
Line 53, delete "and wherein the supply brushes slide against the commutator".
Line 65, change "alone" to -- along --.

Signed and Sealed this

Twenty-first Day of February, 2006

JON W. DUDAS
*Director of the United States Patent and Trademark Office*